United States Patent
Jeong

(10) Patent No.: US 10,421,330 B2
(45) Date of Patent: Sep. 24, 2019

(54) DEVICE AND METHOD FOR ESTIMATING DAMPER FORCE AND DAMPER VELOCITY IN ACTIVE SUSPENSION SYSTEM

(71) Applicant: MANDO Corporation, Pyeongtaek-si, Gyeonggi-do (KR)

(72) Inventor: Seung Hwan Jeong, Yongin-si (KR)

(73) Assignee: MANDO CORPORATION, Pyeongtaek-si, Gyeonggi-do (KR)

(*) Notice: Subject to any disclaimer, the term of this patent is extended or adjusted under 35 U.S.C. 154(b) by 231 days.

(21) Appl. No.: 15/648,611

(22) Filed: Jul. 13, 2017

(65) Prior Publication Data

US 2018/0015802 A1 Jan. 18, 2018

(30) Foreign Application Priority Data

Jul. 18, 2016 (KR) .................. 10-2016-0090731

(51) Int. Cl.
*B60G 17/018* (2006.01)
*B60G 17/019* (2006.01)
*B60G 17/08* (2006.01)

(52) U.S. Cl.
CPC ....... *B60G 17/0182* (2013.01); *B60G 17/019* (2013.01); *B60G 17/08* (2013.01);
(Continued)

(58) Field of Classification Search
None
See application file for complete search history.

(56) References Cited

U.S. PATENT DOCUMENTS 3,807,678 A * 4/1974 Karnopp .............. B60G 17/018
188/266.5
4,465,299 A * 8/1984 Stone ..................... B60G 17/08
188/283
(Continued)

FOREIGN PATENT DOCUMENTS

DE 202007013300 U1 2/2009
DE 102008054573 A1 6/2010
(Continued)

OTHER PUBLICATIONS

Korean Office Action dated Feb. 20, 2018, issued in corresponding Korean Patent Application No. 10-2016-0090731.

*Primary Examiner* — Richard M Camby
(74) *Attorney, Agent, or Firm* — Hauptman Ham, LLP

(57) ABSTRACT

A device and a method of estimating damper force and damper velocity in an active suspension system. First and second pressure sensors sense pressures of a rebound chamber and a compression chamber of a damper in the active suspension system. A controller calculates damper force using the pressures and effective hydraulic pressure areas of the rebound chamber and the compression chamber and calculating damper velocity using pressure-fluid rate characteristics of first to third valve sets and the pressures of the rebound chamber and the compression chamber such that a sum of fluid rates is zero in a node connected between any one of the first to third valve sets and the rebound chamber or the compression chamber, the first to third valve sets being connected between the rebound chamber and an accumulator, between the rebound chamber and the compression chamber, or between the compression chamber and the accumulator.

16 Claims, 6 Drawing Sheets

(52) U.S. Cl.
CPC .......... *B60G 2400/202* (2013.01); *B60G 2400/5182* (2013.01); *B60G 2400/60* (2013.01); *B60G 2600/182* (2013.01); *B60G 2800/9123* (2013.01)

(56) References Cited

U.S. PATENT DOCUMENTS

| | | | |
|---|---|---|---|
| 4,491,207 A * | 1/1985 | Boonchanta | B60G 17/08 188/266.5 |
| 7,386,378 B2 | 6/2008 | Lauwerys et al. | |
| 2005/0071060 A1 | 3/2005 | Lauwerys et al. | |
| 2007/0045067 A1 * | 3/2007 | Schedgick | B60G 17/0152 188/266 |
| 2010/0163356 A1 | 7/2010 | Hennecke et al. | |
| 2011/0187065 A1 * | 8/2011 | Van Der Knaap | B60G 17/0152 280/5.507 |

FOREIGN PATENT DOCUMENTS

| | | |
|---|---|---|
| JP | 2012-247055 A | 12/2012 |
| KR | 10-2009-0029157 A | 3/2009 |
| KR | 100947288 B1 | 3/2010 |
| KR | 10-2015-0105408 A | 9/2015 |
| WO | 2007/097699 A1 | 8/2007 |
| WO | 2012/041787 A1 | 4/2012 |

* cited by examiner

DEVICE AND METHOD FOR ESTIMATING DAMPER FORCE AND DAMPER VELOCITY IN ACTIVE SUSPENSION SYSTEM

CROSS-REFERENCE TO RELATED APPLICATION

This application claims priority to and the benefit of Korean Patent Application No. 10-2016-0090731, filed on Jul. 18, 2016, the disclosure of which is incorporated herein by reference in its entirety.

BACKGROUND

Field

The present disclosure relates to a device and method for estimating damper force and damper velocity in an active suspension system. More particularly, the present disclosure relates to a device and method for estimating damper force and damper velocity in an active suspension system, able to estimate damper force and damper velocity at low cost using characteristic of a damper, pressure measurement and hydraulic characteristics of valve sets connected to the damper without including a separate external sensor.

DESCRIPTION

Generally, a suspension device of a vehicle is a device that connects an axle and a chassis and inhibits vibrations or shocks from being transferred to the chassis during driving of the vehicle to prevent damage to the chassis or freight and to improve ride quality.

The suspension device includes a chassis spring and a damper attenuating free vibration of the chassis spring. In order to control damping force of the damper, it is necessary to estimate damper velocity.

A hydraulic system includes various sensors, such as a sensor sensing a pressure of a main cylinder, a sensor sensing hydraulic pressure, and a sensor sensing a temperature of main devices such as an engine.

U.S. Pat. No. 7,386,378 B2 (registered on 10 Jun. 2008, titled "LINEAR CONTROL OF AN AUTOMOBILE SUSPENSION") discloses a control method of generating an active force by providing a method of controlling a current controlled piston continuously variable semi-active CSVA suspension valve and a base CVSA suspension valve.

Generally, in the case of a hydraulic system, pressure-flow rate characteristics are changed according to a temperature of a fluid. As a result, even under the same current conditions, a difference in force generated by a damper may occur. In addition, since hysteresis is generated according to compression and rebound of the damper, a difference in a force generated by the damper is generated according to stroke of the damper.

In the control method disclosed in U.S. Pat. No. 7,386,378 B2, characteristics of the hydraulic system described above are not taken into account, and thus, it is impossible to overcome a limitation of the hydraulic system itself. That is, a change in damper force according to a supply of a valve current cannot be known without taking a temperature of a fluid and hysteresis according to a compression and a rebound of a damper into account. A separate external sensor is necessary to sense damper force and damper velocity.

Korean Patent No. 10-0947288 (registered on Mar. 5, 2010, titled "SENSOR MODULE COMPRISING ACCELERATION SENSOR AND RELATIVE DISPLACEMENT SENSOR, DAMPER AND ELECTRONICALLY CONTROLLABLE SUSPENSION SYSTEM COMPRISING THE SAME, AND METHOD OF CONTROLLING VEHICLE MOVEMENT USING THE SAME") discloses an example in which damper force and damper velocity are sensed using such a separate external sensor. Korean Patent No. 10-0947288 discloses a damper including a sensor module embedded with an acceleration sensor, sensing acceleration in a Z-axis direction, and a displacement sensor, sensing displacement of a piston rod and coupled to a rod guide.

As described above, in the past, damper velocity has been estimated by sealing an upper end of a cylinder and adding an acceleration sensor and a displacement sensor to a rod guide having a hole into which a piston rod is inserted.

However, when such a separate external sensor is used, as in the past, damper velocity can be estimated, but installabilty is low and costs are increased due to the addition of the separate external sensor, resulting in an increase in an operation amount.

BRIEF SUMMARY

In order to solve the above problems, a device and method for estimating damper force and damper velocity in an active suspension system according to the present disclosure are provided.

Various aspects of the present disclosure provide a device and method for estimating damper force and damper velocity in an active suspension system, able to estimate damper force and damper velocity without using a separate external sensor.

Also provided are a device and method for estimating damper force and damper velocity in an active suspension system, which calculate damper force by using two pressure sensors basically mounted in a damper, estimate damper velocity using the calculated damper force and a flow rate of a hydraulic system, and is able to use the estimated damper velocity to control the damper.

The object of the present disclosure is not limited to the aforementioned description, and other objects not explicitly disclosed herein will be clearly understood by a person skilled in the art from the description provided hereinafter.

According to an aspect, a device for estimating damper force and damper velocity in an active suspension system may include: first and second pressure sensors for sensing pressures of a rebound chamber and a compression chamber of a damper in the active suspension system, respectively; and a controller for calculating the damper force using the pressures and effective hydraulic pressure areas of the rebound chamber and the compression chamber and calculating the damper velocity using pressure-fluid rate characteristics of first to third valve sets and the pressures of the rebound chamber and the compression chamber such that a sum of fluid rates is zero in a node connected between any one of the first to third valve sets and the rebound chamber or the compression chamber, the first to third valve sets being connected between the rebound chamber and an accumulator, between the rebound chamber and the compression chamber, or between the compression chamber and the accumulator.

The controller may calculate the damper force from a difference between a multiplication of the effective hydraulic pressure area and the pressure of the rebound chamber and a multiplication of the effective hydraulic pressure area and the pressure of the compression chamber.

The controller may calculate the damper velocity with respect to the node connected to the rebound chamber.

The controller may calculate the damper velocity from a ratio of the effective hydraulic pressure area of the rebound chamber to a flow rate of fluid discharged from the rebound chamber.

The controller may calculate the discharge flow rate from a sum of a flow rate with respect to the first valve set connected between the rebound chamber and the accumulator and a flow rate with respect to the second valve set connected between the rebound chamber and the compression chamber, the flow rate with respect to the first valve set being caused by a difference between the sensed pressure of the rebound chamber and the sensed pressure of the accumulator, and the flow rate with respect to the second valve set being caused by a difference between the sensed pressure of the rebound chamber and the sensed pressure of the compression chamber.

The first valve set connected between the compression chamber and the accumulator may include a third check valve and a pump, the second valve set connected between the rebound chamber and the compression chamber may include a first check valve, a first blow-off valve, and a first semi-active valve, and the third valve set connected between the compression chamber and the accumulator may include a second check valve, a second blow-off valve, and a second semi-active valve.

The controller may calculate the discharge flow rate from a sum of a flow rate of fluid discharged by the pump and flow rates with respect to the first check valve, the first blow-off valve, and the first semi-active valve, caused by the difference between the sensed pressure of the rebound chamber and the sensed pressure of the compression chamber.

The first valve set connected between the compression chamber and the accumulator may include a first check valve and a pump, the second valve set connected between the rebound chamber and the compression chamber may be provided in a piston of the damper and may include a first solenoid valve and a first blow-off valve, and the third valve set connected between the compression chamber and the accumulator may include a second check valve and a second solenoid valve.

The controller may calculate the discharge flow rate from a sum of a flow rate of fluid discharged by the pump, flow rates with respect to the first solenoid valve and the first blow-off valve, and a flow rate with respect to the first check valve, the flow rates with respect to the first solenoid valve and the first blow-off valve being caused by the difference between the sensed pressure of the rebound chamber and the sensed pressure of the compression chamber and the flow rate with respect to the first check valve being caused by the sensed pressure of the rebound chamber and the sensed pressure of the accumulator.

According to another aspect, a method of estimating damper force and damper velocity in an active suspension system may include: sensing pressures of a rebound chamber and a compression chamber of a damper in the active suspension system; calculating the damper force using the pressures and effective hydraulic pressure areas of the rebound chamber and the compression chamber; and calculating the damper velocity using pressure-fluid rate characteristics of first to third valve and the pressures of the rebound chamber and the compression chamber such that a sum of fluid rates is zero in a node connected between the rebound chamber or the compression chamber and any one of the first to third valve sets, the first to third valve sets being connected between the rebound chamber and an accumulator, between the rebound chamber and the compression chamber, or between the compression chamber and the accumulator.

In the calculation of the damper force, the damper force may be calculated from a difference between a multiplication of the effective hydraulic pressure area and the pressure of the rebound chamber and a multiplication of the effective hydraulic pressure area and the pressure of the compression chamber.

In the calculation of the damper velocity, the damper velocity may be calculated with respect to a node connected to the rebound chamber.

In the calculation of the damper velocity, the damper velocity may be calculated from a ratio of the effective hydraulic pressure area of the rebound chamber to a flow rate of fluid discharged from the rebound chamber.

In the calculation of the damper velocity, the damper velocity may be calculated from a sum of a flow rate with respect to the first valve set connected between the rebound chamber and the accumulator and a flow rate with respect to the second valve connected between the rebound chamber and the compression chamber, the flow rate with respect to the first valve set being caused by a difference between the sensed pressure of the rebound chamber and the sensed pressure of the accumulator, and the flow rate with respect to the second valve set being caused by a difference between the sensed pressure of the rebound chamber and the sensed pressure of the compression chamber.

The first valve set connected between the compression chamber and the accumulator may include a third check valve and a pump, the second valve set connected between the rebound chamber and the compression chamber may include a first check valve, a first blow-off valve, and a first semi-active valve, the third valve set connected between the compression chamber and the accumulator may include a second check valve, a second blow-off valve, and a second semi-active valve. In the calculation of the damper velocity, the discharge flow rate may be calculated from a sum of a flow rate of fluid discharged by the pump and flow rates with respect to the first check valve, the first blow-off valve, and the first semi-active valve, caused by the difference between the sensed pressure of the rebound chamber and the sensed pressure of the compression chamber.

The first valve set connected between the compression chamber and the accumulator may include a first check valve and a pump, the second valve set connected between the rebound chamber and the compression chamber may be provided at a piston of the damper and may include a first solenoid valve and a first blow-off valve, the third valve set connected between the compression chamber and the accumulator may include a second check valve and a second solenoid valve. In the calculation of the damper velocity, the discharge flow rate may be calculated from a sum of a flow rate of fluid discharged by the pump, flow rates with respect to the first solenoid valve and the first blow-off valve, and a flow rate with respect to the first check valve, the flow rates with respect to the first solenoid valve and the first blow-off valve being caused by the difference between the sensed pressure of the rebound chamber and the sensed pressure of the compression chamber and the flow rate with respect to the first check valve being caused by the sensed pressure of the rebound chamber and the sensed pressure of the accumulator.

According to the present disclosure, in the device and method for estimating damper force and damper velocity in an active suspension system, since damper force is estimated using the sensed pressure sensor for measuring damper pressure, it is unnecessary to install an external sensor, thereby improving installability and reducing costs.

Furthermore, according to the present disclosure, since damper velocity is estimated using characteristics of a hydraulic system and damper force, it is unnecessary to use an external sensor, thereby controlling a damper by reflecting the characteristics of the hydraulic system.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Exemplary embodiments of the present disclosure will be described below in detail with reference to the accompanying drawings in which components are denoted using the same or similar reference numbers, regardless of the figure number, and redundant explanations are omitted.

In the following description of the present disclosure, detailed descriptions of known functions and components incorporated herein will be omitted in the case that the subject matter of the present disclosure may be rendered unclear thereby. The accompanying drawings are used to help easily understood the technical idea of the present disclosure and it should be understood that the idea of the present disclosure is not limited by the accompanying drawings.

Figure 1:
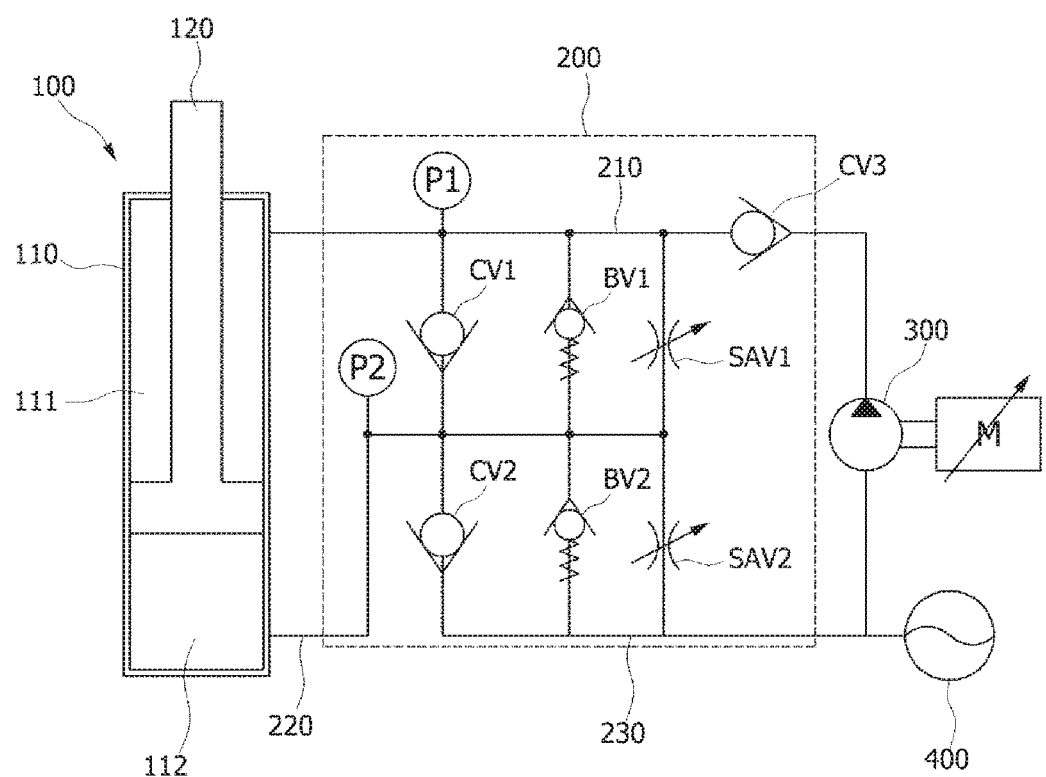
FIG. 1 is a diagram illustrating the configuration of an active suspension system including a device for estimating damper force and damper velocity according to an exemplary embodiment.

FIG. 1 is a diagram illustrating the configuration of an active suspension system including a device for estimating damper force and damper velocity according to an exemplary embodiment.

Referring to FIG. 1, the active suspension system including the device for estimating damper force and damper velocity according to the exemplary embodiment includes a damper 100, a hydraulic system 200 supplying hydraulic pressure to the damper 100 and allowing a flow rate to be calculated, a pump 300 supplying flow pressure to a fluid of the hydraulic system 200, and an accumulator 400 attenuating pulsation pressure.

The damper 100 includes a cylinder 110 and a piston 120 vertically moving in the cylinder 110 and partitioning an interior space of the cylinder 110 into a rebound chamber 111 and a compression chamber 112.

The hydraulic system 200 includes first and second pressure sensors P1 and P2 sensing pressures (Preb and Pcomp) of the rebound chamber 111 and the compression chamber 112, respectively, a first channel 210 connecting the rebound chamber 111 and the pump 300, a second channel 220 connecting the pump 300 and the accumulator 400, a third channel 230 having one end connected to the compression chamber 112, a first check valve CV1, a first blow-off valve BV1, and a first semi-active valve SAV1 connected in parallel between the first channel 210 and the third channel 230, a second check valve CV2, a second blow-off valve BV2, and a second semi-active valve SAV2 connected in parallel between the second channel 220 and the third channel 230, and a third check valve CV3 connected to the first channel 210.

Hereinafter, a configuration and an operation of the device for estimating damper force and damper velocity 100 in the active suspension system according to the exemplary embodiment configured above will be described in more detail. A method of estimating damper force and damper velocity in order to control the damper 100 will be described in detail.

First, the damper 100 may include the piston 120 moving vertically in the cylinder 110 and may include a solenoid valve in the piston 120 to control a flow of a fluid.

The piston 120 includes a piston rod and a piston valve partitioning the interior space of the cylinder 110 into the rebound chamber 111 and the compression chamber 112. The solenoid valve is provided in the piston valve.

The damper 100 having the structure described above is a configuration of the active suspension system and is to improve ride quality and control an attitude of a vehicle by reducing vibrations, road roughness, a stepped portion, or the like during driving of the vehicle. The damper 100 should provide damper force and damper velocity, suitable for various situations.

The hydraulic system 200 includes a channel connecting the compression chamber 112 and the rebound chamber 111 of the cylinder 110. For convenience of description, descriptions describe the case in which the channel is divided into the first to third channels 210 to 230.

The pump 300 for circulating a fluid is connected to the channel of the hydraulic system 200. The accumulator 400 for attenuating pulsation pressure is connected to the channel, the pulsation pressure being generated when the pump 300 circulates the fluid.

Specifically, the channel of the hydraulic system 200 includes the first channel 210 connecting the rebound chamber 111 and an outlet of the pump 300, the third channel 230 connecting an inlet of the pump 300 and the accumulator 400, and the second channel 220 connected to the compression chamber 112.

The first pressure sensor P1 is disposed in the first channel 210 to sense the pressure (Preb) of the rebound chamber 111. The second pressure sensor P2 is disposed in the second channel 220 to sense the pressure (Pcomp) of the compression chamber 112.

In the configuration described above, damper force is calculated using the pressure (Preb) of the rebound chamber 111 sensed by the first pressure sensor P1 and the pressure (Pcomp) of the compression chamber 112 sensed by the second pressure sensor P2.

When it is assumed that an effective hydraulic pressure area of the rebound chamber 111 is Areb and an effective hydraulic pressure area of the compression chamber 112 is Acomp, damper force (Fdamper) may be represented by Formula 1:

$$Fdamper = Areb \times Preb - Acomp \times Pcomp \quad (1)$$

That is, taking into account that pressure is force per unit area, force during a rebound stroke and force during a compression stroke may be respectively calculated using the pressure (Preb) as well as the effective hydraulic pressure area (Areb) of the rebound chamber 111 and the pressure (Pcomp) as well as the effective hydraulic pressure area (Acomp) of the compression chamber 112, and the damper force (Fdamper) may be calculated from a difference between the force during the rebound stroke and the force during the compression stroke.

Here, the damper force (Fdamper) may have a positive (+) value or a negative (−) value. The positive (+) value and the negative (−) value may refer to a value during a rebound stroke and a value during a compression stroke, respectively.

The damper force (Fdamper) may be calculated by a controller (not shown) installed in a vehicle.

The effective hydraulic pressure area (Areb) of the rebound chamber 111 and the effective hydraulic pressure area (Acomp) of the compression chamber 112 may be a constant known from a design value of the cylinder 110. Accordingly, when the pressures (Preb and Pcomp) of the rebound chamber 111 and the compression chamber 112 respectively sensed by the first and second pressure sensors P1 and P2 are known, the controller may easily calculate the damper force (Fdamper).

Figure 2:
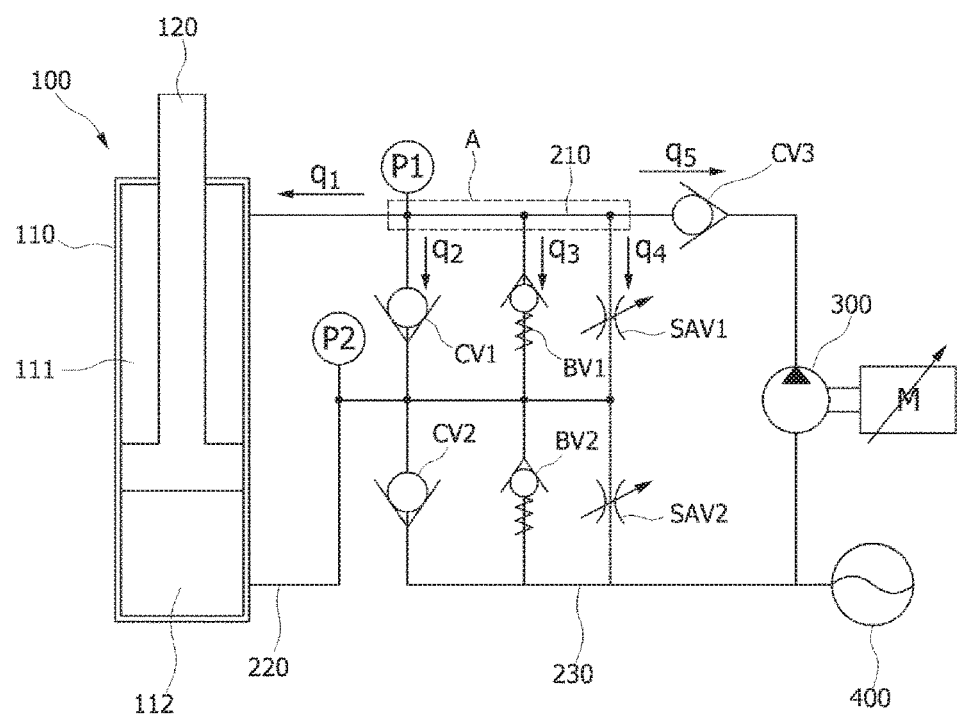
FIG. 2 is a diagram illustrating a method of estimating damper velocity in order to control a damper according to an exemplary embodiment.

FIG. 2 is a diagram illustrating a method of estimating damper velocity in order to control the damper 100 according to the exemplary embodiment.

Referring to FIG. 2, flow rates in respective directions may be taken into account with respect to a node A of the first channel 210.

A first flow rate q1 is a flow rate of fluid supplied to the rebound chamber 111 from the node A. A second flow rate q2 is a flow rate of fluid flowing into the first check valve CV1 from the node A. A third flow rate q3 is a flow rate of fluid flowing into the first blow-off valve BV1 from the node A. A fourth flow rate q4 is a flow rate of fluid flowing into the first semi-active valve SAV1 from the node A. A fifth flow rate q5 is a flow rate of fluid flowing into the third check valve CV3.

In the node A, the first to fourth flow rates q1 to q4 are determined according to conditions, and the fifth flow rate q5 denotes a flow rate of fluid substantially flowing toward the node A and has a negative value with respect to an arrow direction illustrated in FIG. 2. Therefore, the sum of the first to fifth flow rates q1 to q5 is always zero (0) in the node A.

That is, the flow rate in the node A may be represented by Formula 2:

$$q1 + q2 + q3 + q4 + q5 = 0 \quad (2)$$

The first flow rate q1 is a multiplication of the damper velocity (Vdamper) and the effective hydraulic pressure area (Areb) of the rebound chamber 111. The second flow rate q2 is a flow rate of the first check valve CV1, is caused by characteristics of the first check valve CV1 itself, is represented by a function (fc(Preb, Pcomp)) according to the pressures (Preb and Pcomp) of the rebound chamber 111 and the compression chamber 112, and is a flow rate easily calculated from the pressures (Preb and Pcomp) sensed by the first and second pressure sensors P1 and P2 and a specification of the first check valve CV1.

Figure 3:
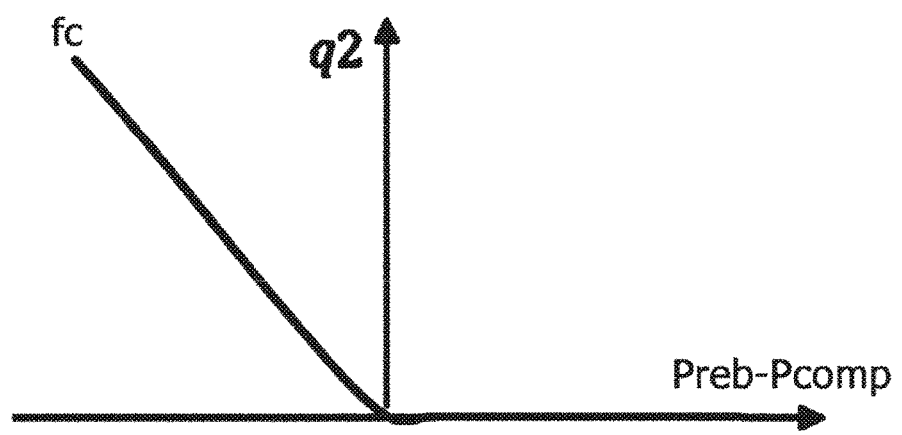
FIG. 3 is a graph snowing an example of a function (fc(Preb, Pcomp))

FIG. 3 is a graph showing an example of a function (fc(Preb, Pcomp)). It may be seen that as a difference between the pressure (Preb) of the rebound chamber 111 and the pressure (Pcomp) of the compression chamber 112 is reduced, the second flow rate q2 is linearly increased.

In the same manner as the calculation of the second flow rate q2, the third flow rate q3 and the fourth flow rate q4 may be easily calculated through functions ((fb(Preb, Pcomp) and fs(Preb, Pcomp)) obtained from the pressures (Preb and Pcomp) of the rebound chamber 111 and the compression chamber 112 and specifications of the first blow-off valve BV1 and the first semi-active valve SAV1.

Figure 4:
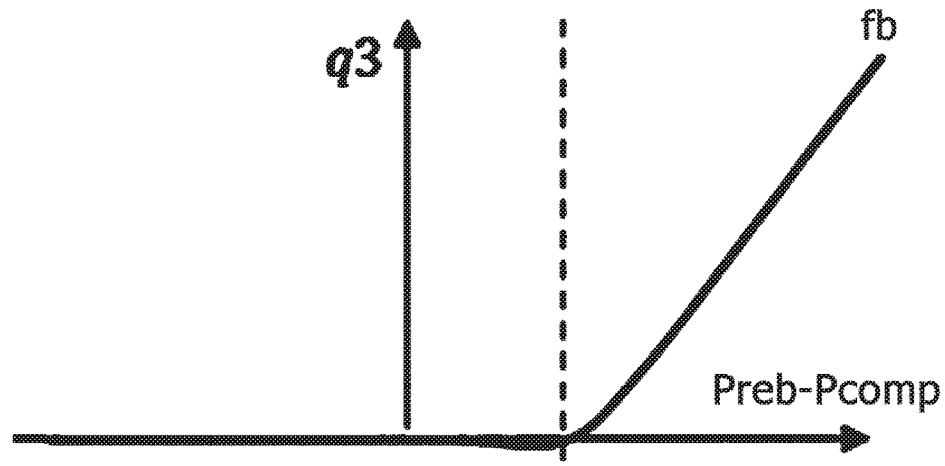
FIG. 4 is a graph showing an example of a function (fb(Preb, Pcomp))

FIG. 4 is a graph showing an example of a function (fb(Preb, Pcomp)). When a difference between the pressure (Preb) of the rebound chamber 111 and the pressure (Pcomp) of the compression chamber 112 is increased to a certain value or more, the third flow rate q3 is linearly increased, and when the difference between the pressure (Preb) of the rebound chamber 111 and the pressure (Pcomp) of the compression chamber 112 is lower than the certain value, the second third flow rate q3 is zero.

Figure 5:
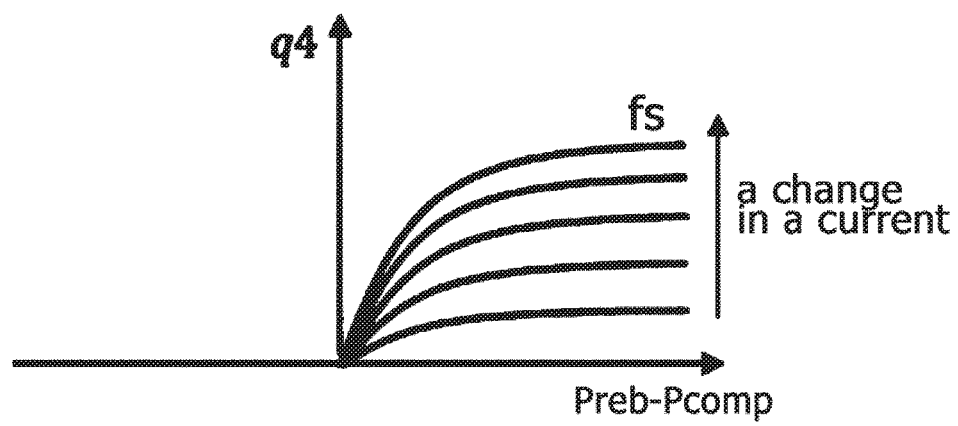
FIG. 5 is a graph showing an example of a function (fs(Preb, Pcomp))

FIG. 5 is a graph showing an example of a function (fs(Preb, Pcomp)). It may be seen that as a difference between the pressure (Preb) of the rebound chamber 111 and the pressure (Pcomp) of the compression chamber 112 is increased, the fifth flow rate q4 is nonlinearly increased. In addition, it may be confirmed that as a magnitude of a current supplied to the first semi-active valve SAV1 is increased, the fourth flow rate q4 is increased. However, characteristics of the first semi-active valve SAV1 are not limited thereto, and as the magnitude of the current is decreased, the fourth flow rate q4 may be increased.

Since the fifth flow rate q5 is a flow rate of fluid discharged from the pump 300, the fifth flow rate q5 is defined as a multiplication of a rotational speed (RPM) of a motor for driving the pump 300 and a discharge rate (K) per one rotation of the pump 300. When a rotational speed (RPM) of the motor is detected, the fifth flow rate q5 may be confirmed through a specification of the pump 300.

Formula 3 below may be deduced by substituting the first to fifth flow rates q1 to q5 defined above into Formula 3:

$$(Vdamper \times Areb) + fc(Preb, Pcomp) + fb(Preb, Pcomp) + fs(Preb, Pcomp) + (RPM \times K) = 0 \quad (3)$$

The damper velocity (Vdamper) may be represented by Formula 4 through Formula 3:

$$Vdamper = -((fc(Preb, Pcomp) + fb(Preb, Pcomp) + fs(Preb, Pcomp) + (RPM \times K))/Areb \quad (4)$$

In Formula 4, all values of the right side may be easily calculated from specifications of the aforementioned valves by obtaining the pressures (Preb and Pcomp) sensed by the first and second pressure sensors P1 and P2, the rotational speed (RPM) of the motor, and the current supplied to the first semi-active valve SAV1.

Therefore, the damper velocity (Vdamper) may be easily calculated without mounting a separate external sensor.

The damper velocity (Vdamper) may be calculated by a controller (not shown) installed in a vehicle.

The detailed descriptions of the exemplary embodiment provided with reference to FIGS. 1 to 5 have described the case in which the node A is placed in the first channel 210 connected to the rebound chamber 111. That is, the detailed descriptions have been provided based on the pressure of the rebound chamber 111.

A case in which the description of the node A being placed in the second channel 220 connected to the compression chamber 112 is based on the pressure of the compression chamber 112, and in the aforementioned functions, Preb and Pcomp may be substituted with each other.

A specific example based on the pressure of the compression chamber 112 may be easily implemented by modifying an example described based on the rebound chamber 111. Accordingly, a specific estimation example of the damper velocity (Vdamper) based on the compression chamber 112 will be omitted.

The damper force (Fdamper) and the damper velocity (Vdamper) calculated above are used in operation control of the damper 100 by a controller of a vehicle later and are actively involved in improving ride quality and controlling an attitude of a vehicle.

Figure 6:
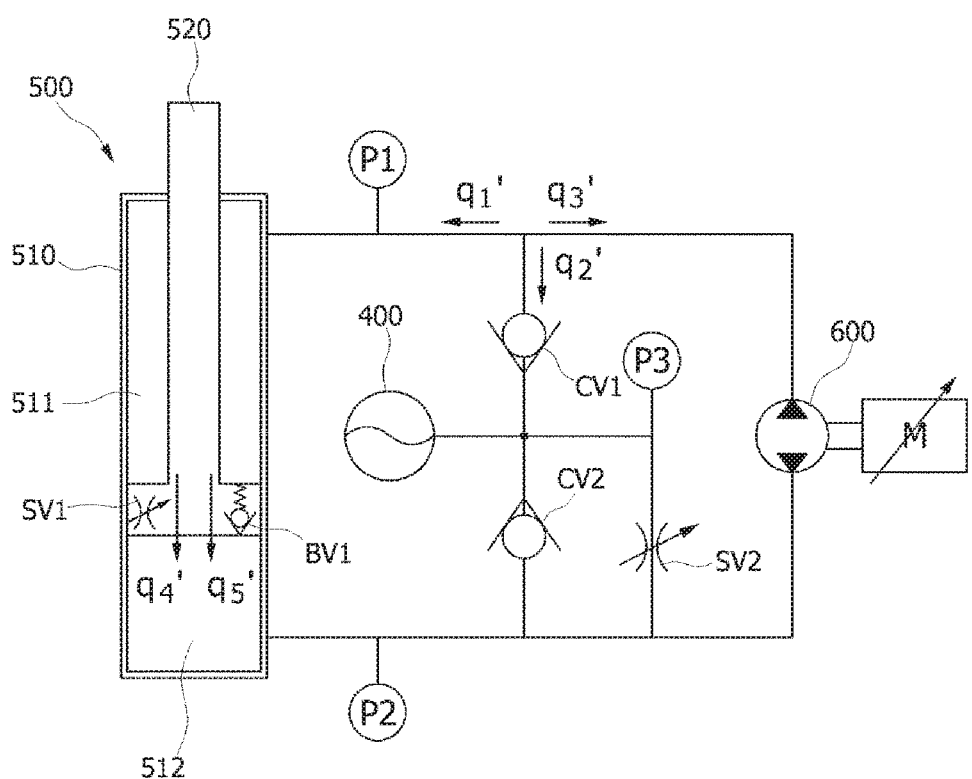
FIG. 6 is a block diagram illustrating the configuration of an active suspension system including a device for estimating damper force and damper velocity according to another exemplary embodiment.

FIG. 6 is a block diagram illustrating the configuration of an active suspension system including a device for estimating damper force and damper velocity according to another exemplary embodiment.

Referring to FIG. 6, a damper 500, a channel connecting the damper 500 and an accumulator 400, and a pump 600 of another embodiment of the active suspension system including the device for estimating damper force and damper velocity are different from those of the active suspension system shown in FIG. 1.

Here, the damper 500 may include a first solenoid valve SV1 and a first blow-off valve BV1, provided in a piston 520.

A first check valve CV1 may be connected between a rebound chamber 511 and the accumulator 400. A second check valve CV2 and a second solenoid valve SV2 may be connected in parallel between a compression chamber 512 and the accumulator 400.

A pump 600 may be a bidirectional pump and may be connected between the rebound chamber 511 and the compression chamber 512.

In the configuration described above, a controller (not shown) may estimate damper velocity (Vdamper) with respect to a node connected to the rebound chamber 511.

Here, a first flow rate q1' is a flow rate of fluid supplied to the rebound chamber 511. A second flow rate q2' is a flow rate of fluid flowing into the first check valve CV1. A third flow rate q3' is a flow rate of fluid discharged from the pump 600.

In a similar manner as described with reference to FIG. 2, the first flow rate q1' may be represented by a multiplication of damper velocity (Vdamper) and an effective hydraulic pressure area (Areb) of the rebound chamber 511 and may be the sum of a fourth flow rate q4' of fluid flowing into the first solenoid valve SV1 and a fifth flow rate q5' of fluid flowing into the first blow-off valve BV1. Here, the fourth flow rate q4' and the fifth flow rate q5' may be represented by a function (fs' (Preb, Pcomp)) and a function (fb(Preb, Pcomp)) according to pressures (Preb and Pcomp) of the rebound chamber 511 and the compression chamber 512, respectively.

In addition, the second flow rate q2' may be represented by a function (fc(Preb, Pacc)) according to pressures (Preb and Pacc) of the rebound chamber 511 and the accumulator 400. The third flow rate q3' may be represented by a multiplication of a rotational speed (RPM) of a motor and a discharge rate (k) per one rotation of the pump 600. The sum of the first to third flow rates are always zero.

Here, the pressure (Pacc) of the accumulator 400 may be assumed to be a certain constant value. The functions (fs' (Preb, Pcomp), fb(Preb, Pcomp), and fc(Preb, Pacc)) may be known through pressure-flow rate characteristics of the first solenoid valve SV1, the first blow-off valve BV1, and the first check valve CV1, respectively.

Therefore, the damper velocity (Vdamper) may be represented by Formula 5:

$$V\text{damper} = -((fc(Preb, Pacc) + fb(Preb, Pcomp) + fs'(Preb, Pcomp) + (RPM \times K))/A\text{reb} \quad (5)$$

That is, the controller (not shown) may calculate the damper velocity (Vdamper) from a ratio of an effective hydraulic pressure area (Areb) of the rebound chamber 511 to the second to fifth flow rates q2' to q5' of fluids discharged from the rebound chamber 511. Here, the controller (not shown) may calculate the discharge flow rate from the sum of a flow rate of fluid discharged by the pump 600, flow rates with respect to the first solenoid valve SV1 and the first blow-off valve BV1, and a flow rate with respect to the first check valve CV1, the flow rates with respect to the first solenoid valve SV1 and the first blow-off valve BV1 being caused by a difference between the pressure (Preb) of the rebound chamber 511 sensed by a first pressure sensor P1 and the pressure (Pcom) of the compression chamber 512 sensed by a second pressure sensor P2, and the flow rate with respect to the first check valve CV1 being caused by a difference between the pressure (Preb) of the rebound chamber 511 and the pressure (Pacc) of the accumulator 400.

On the other hand, the controller (not shown) may also estimate damper force and damper velocity using a node connected to the compression chamber 512.

The estimation of damper force and damper velocity using the node connected to the compression chamber 512 is based on the pressure (Pcomp) of the compression chamber 512, and in the aforementioned functions, Preb and Pcomp may be substituted with each other.

A specific example based on the pressure (Pcomp) of the compression chamber 512 may be easily implemented by modifying an example described based on the rebound chamber 511. Accordingly, a specific estimation example of the damper velocity (Vdamper) based on the compression chamber 512 will be omitted.

The damper force damper (Fdamper) and the damper velocity (Vdamper) calculated above are used in operation control of the damper 500 by a controller of a vehicle later and are actively involved in improving ride quality and controlling an attitude of a vehicle.

Figure 7:
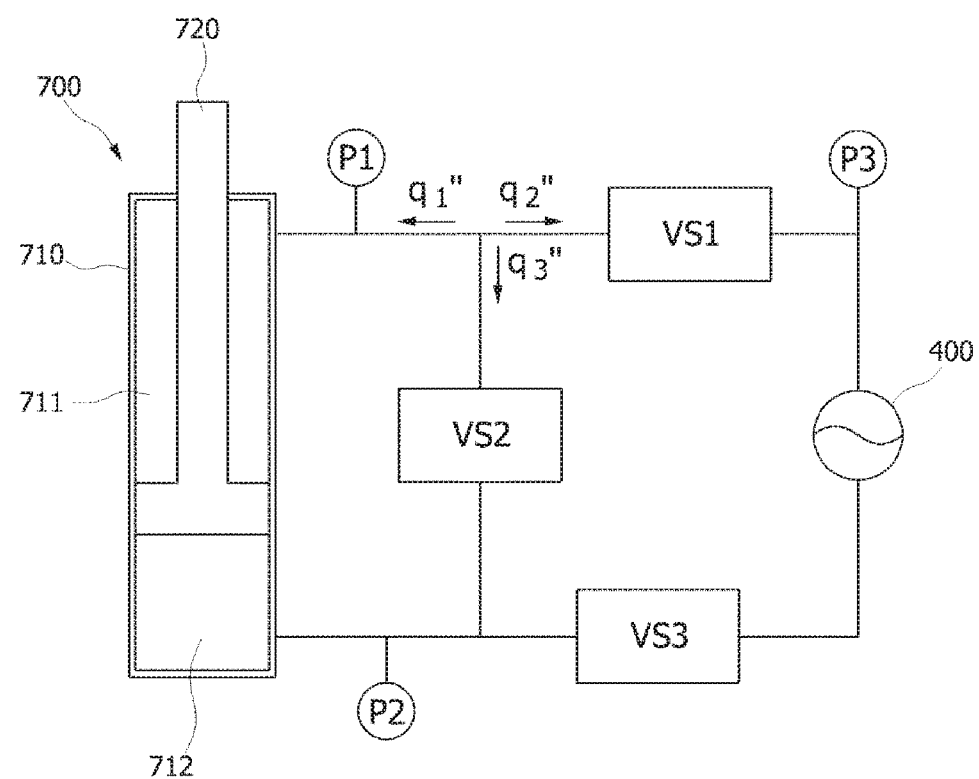
FIG. 7 is a block diagram illustrating the configuration of an active suspension system including a device for estimating damper force and damper velocity according to further another exemplary embodiment.

FIG. 7 is a block diagram illustrating the configuration of an active suspension system including a device for estimating damper force and damper velocity according to further another exemplary embodiment.

Referring to FIG. 7, another embodiment of the active suspension system including the device for estimating damper force and damper velocity encompasses the active suspension systems of FIG. 1 and FIG. 6.

Here, a damper 700 may be the same as the damper 100 of FIG. 1. A first valve set VS1 may be connected between a rebound chamber 711 and an accumulator 400. A second valve set VS2 may be connected between the rebound chamber 711 and a compression chamber 712. A third valve set VS3 may be connected between the compression chamber 712 and the accumulator 400.

The first valve set VS1, the second valve set VS2, and the third valve set VS3 may include at least one of a check valve, a semi-active valve, a blow-off valve, and a solenoid valve, or a series or parallel combination thereof.

The damper 700 may be a general system, a semi-active system, or an active system due to the first to third valve sets VS1 to VS3. In particular, when the damper 700 is the active system, any one of the first valve set VS1, the second valve set VS2, and the third valve set VS3 may include a pump.

Referring to FIG. 1, the first valve set VS1 may include the third check valve CV3 and the pump 300. The second valve set VS2 may include the second valve set CV2, the first blow-off valve BV1, and the first semi-active valve SAV1. The third valve set VS3 may include the second check valve CV2, the second blow-off valve BV2, and the second semi-active valve SAV2.

Referring to FIG. 6, the first valve set VS1 may include the first check valve CV1 and the pump 600. The second valve set CV2 may be provided in the piston 520 and may include the first solenoid valve SV1 and the first blow-off valve BV1. The third valve set VS3 may include the second check valve CV2 and the second solenoid valve SV2.

In the configuration described above, a controller (not shown) may estimate damper velocity (Vdamper) with respect to a node connected to the rebound chamber 711.

Here, a first flow rate q1" is a flow rate of fluid supplied to the rebound chamber 711. A second flow rate q2" is a flow rate of fluid flowing into the first valve set SV1. A third flow rate q3" is a flow rate of fluid flowing into the second valve set SV2.

In a similar manner as described with reference to FIG. 2, the first flow rate q1" may be represented by a multiplication of damper velocity (Vdamper) and an effective hydraulic pressure area (Areb) of the rebound chamber 711. The second flow rate q2" and the third flow rate q3" may be represented by pressure-flow rate characteristics with respect to the first valve set VS1 and the second valve set VS2, respectively. The sum of the first to third flow rates q1" to q3" is always zero.

Here, a flow rate of each of the first to third valve sets VS1 to VS3 may be represented by the sum of flow rates of fluids flowing into configuration valves included in each of the first to third valve sets VS1 to VS3. The flow rates of fluids flowing into the configuration valves may be represented by Formula 6:

$$Qij = f\_ij(Pa, Pb) \quad (6)$$

In Formula 6, i is an index of a valve set, j is an index of a configuration valve in a corresponding valve set, and a and b is a pressure index of a chamber or an accumulator, adjacent to the corresponding valve set.

Here, the first valve set VS1 needs the pressure (Pacc) of the accumulator 400 measured by the third pressure sensor P3 in order to accurately calculate each of configuration valves included in the first valve set VS1. However, in the case of a general damper, since an accumulator formed at a low pressure and a change in a pressure is low in the accumulator, the pressure (Pacc) of then accumulator 400 may be assumed to be a constant, and f_ij(Pa, Pb) may be known through pressure-flow rate characteristics of a corresponding configuration valve.

Therefore, the damper velocity (Vdamper) may be represented by Formula 7:

$$V\text{damper} = -(\Sigma_j Q1j + \Sigma_j Q2j)/A\text{reb}$$

$$V\text{damper} = -(\Sigma_j f\_1j(Preb, Pacc) + \Sigma_j f\_2j(Preb, Pcomp))/A\text{reb} \quad (7)$$

That is, the controller (not shown) may calculate the damper velocity (Vdamper) from a ratio of the effective hydraulic pressure area (Areb) of the rebound chamber 711 to the second and third flow rates q2" to q3" of fluids discharged from the rebound chamber 711. Here, the controller (not shown) may calculate the discharge second and third flow rates q2" to q3" from the sum of a flow rate with respect to the first valve set VS1 and a flow rate with respect to the second valve set VS2, the flow rate with respect to the first valve set VS1 being caused by a difference between the pressure (Preb) of the rebound chamber 711 sensed by the first pressure sensor P1 and the pressure (Pacc) of the accumulator 400 sensed by the third pressure sensor P3 or represented by a constant, and the flow rate with respect to the second valve set VS2 being caused by a difference between the pressure (Preb) and the pressure (Pcom) of the compression chamber 712 sensed by the second pressure sensor P2.

On the other hand, the controller (not shown) may also estimate damper force and damper velocity using a node connected to the compression chamber 712.

The estimation of damper force and damper velocity using the node connected to the compression chamber 712 is based on the pressure Pcomp of the compression chamber 712, and in the aforementioned functions, a function f_1j (Preb, Pacc) may be substituted with a function f_3j(Pacc, Pcomp).

A specific example based on the pressure (Pcomp) of the compression chamber 712 may be easily implemented by modifying an example described based on the rebound chamber 711. Accordingly, a specific estimation example of the damper velocity (Vdamper) based on the compression chamber 711 will be omitted.

The damper force (Fdamper) and the damper velocity (Vdamper) calculated above are used in operation control of the damper 700 by a controller of a vehicle later and are actively involved in improving ride quality and controlling an attitude of a vehicle.

Embodiments described in this specification and the accompanying drawings are only examples describing a part of the scope and spirit of the present disclosure. Therefore, the embodiments disclosed herein are provided to describe the scope and spirit of the present disclosure and not for purposes of limitation. Therefore, it is apparent that the present disclosure is not limited to these embodiments. It should be understood that modifications and detailed embodiments that can be easily inferred by those skilled in the art within the scope and spirit included in the specification and drawings of the present disclosure fall within the scope of the present disclosure.

What is claimed is:

1. A device for estimating damper force and damper velocity in an active suspension system, the device comprising:

first and second pressure sensors for sensing pressures of a rebound chamber and a compression chamber of a damper in the active suspension system, respectively; and a controller for calculating damper force using the pressures and effective hydraulic pressure areas of the rebound chamber and the compression chamber and calculating damper velocity using pressure-fluid rate characteristics of first to third valve sets and the pressures of the rebound chamber and the compression chamber such that a sum of fluid rates is zero in a node connected between any one of the first to third valve sets and the rebound chamber or the compression chamber, the first to third valve sets being connected between the rebound chamber and an accumulator, between the rebound chamber and the compression chamber, or between the compression chamber and the accumulator.

2. The device according to claim 1, wherein the controller calculates the damper force from a difference between a multiplication of the effective hydraulic pressure area and the pressure of the rebound chamber and a multiplication of the effective hydraulic pressure area and the pressure of the compression chamber.

3. The device according to claim 1, wherein the controller calculates the damper velocity with respect to the node connected to the rebound chamber.

4. The device of the claim 3, wherein the controller calculates the damper velocity from a ratio of the effective hydraulic pressure area of the rebound chamber to a flow rate of fluid discharged from the rebound chamber.

5. The device according to claim 4, wherein the controller calculates the discharge flow rate from a sum of a flow rate with respect to the first valve set connected between the rebound chamber and the accumulator and a flow rate with respect to the second valve set connected between the rebound chamber and the compression chamber, the flow rate with respect to the first valve set being caused by a difference between the sensed pressure of the rebound chamber and the sensed pressure of the accumulator, and the flow rate with respect to the second valve set being caused by a difference between the sensed pressure of the rebound chamber and the sensed pressure of the compression chamber.

6. The device according to claim 4, wherein the first valve set connected between the compression chamber and the accumulator comprises a third check valve and a pump,
the second valve set connected between the rebound chamber and the compression chamber comprises a first check valve, a first blow-off valve, and a first semi-active valve, and
the third valve set connected between the compression chamber and the accumulator comprises a second check valve, a second blow-off valve, and a second semi-active valve.

7. The device according to claim 6, wherein the controller calculates the discharge flow rate from a sum of a flow rate of fluid discharged by the pump and flow rates with respect to the first check valve, the first blow-off valve, and the first semi-active valve, caused by the difference between the sensed pressure of the rebound chamber and the sensed pressure of the compression chamber.

8. The device according to claim 4, wherein the first valve set connected between the compression chamber and the accumulator comprises a first check valve and a pump,
the second valve set connected between the rebound chamber and the compression chamber is provided in a piston of the damper and comprises a first solenoid valve and a first blow-off valve, and
the third valve set connected between the compression chamber and the accumulator comprises a second check valve and a second solenoid valve.

9. The device according claim 8, wherein the controller calculates the discharge flow rate from a sum of a flow rate of fluid discharged by the pump, flow rates with respect to the first solenoid valve and the first blow-off valve, and a flow rate with respect to the first check valve, the flow rates with respect to the first solenoid valve and the first blow-off valve being caused by the difference between the sensed pressure of the rebound chamber and the sensed pressure of the compression chamber, and the flow rate with respect to the first check valve being caused by the sensed pressure of the rebound chamber and the sensed pressure of the accumulator.

10. A method of estimating damper force and damper velocity in an active suspension system, the method comprising:
sensing pressures of a rebound chamber and a compression chamber of a damper in the active suspension system;
calculating damper force using the pressures and effective hydraulic pressure areas of the rebound chamber and the compression chamber; and
calculating damper velocity using pressure-fluid rate characteristics of first to third valve sets and the pressures of the rebound chamber and the compression chamber such that a sum of fluid rates is zero in a node connected between the rebound chamber or the compression chamber and any one of the first to third valve sets, the first to third valve sets being connected between the rebound chamber and an accumulator, between the rebound chamber and the compression chamber, or between the compression chamber and the accumulator.

11. The method according to claim 10, wherein, in the calculation of the damper force, the damper force is calculated from a difference between a multiplication of the effective hydraulic pressure area and the pressure of the rebound chamber and a multiplication of the effective hydraulic pressure area and the pressure of the compression chamber.

12. The method of the claim 10, wherein, in the calculation of the damper velocity, the damper velocity is calculated with respect to a node connected to the rebound chamber.

13. The method according to claim 12, wherein, in the calculation of the damper velocity, the damper velocity is calculated from a ratio of the effective hydraulic pressure area of the rebound chamber to a flow rate of fluid discharged from the rebound chamber.

14. The method according to claim 13, wherein, in the calculation of the damper velocity, the damper velocity is calculated from a sum of a flow rate with respect to the first valve set connected between the rebound chamber and the accumulator and a flow rate with respect to the second valve connected between the rebound chamber and the compression chamber, the flow rate with respect to the first valve set being caused by a difference between the sensed pressure of the rebound chamber and the sensed pressure of the accumulator, and the flow rate with respect to the second valve set being caused by a difference between the sensed pressure of the rebound chamber and the sensed pressure of the compression chamber.

15. The method according to claim 13, wherein the first valve set connected between the compression chamber and the accumulator comprises a third check valve and a pump,
the second valve set connected between the rebound chamber and the compression chamber comprises a first check valve, a first blow-off valve, and a first semi-active valve,
the third valve set connected between the compression chamber and the accumulator comprises a second check valve, a second blow-off valve, and a second semi-active valve, and
in the calculation of the damper velocity, the discharge flow rate is calculated from a sum of a flow rate of fluid discharged by the pump and flow rates with respect to the first check valve, the first blow-off valve, and the first semi-active valve, caused by the difference between the sensed pressure of the rebound chamber and the sensed pressure of the compression chamber.

16. The method according to claim 13, wherein the first valve set connected between the compression chamber and the accumulator comprises a first check valve and a pump,
- the second valve set connected between the rebound chamber and the compression chamber is provided at a piston of the damper and comprises a first solenoid valve and a first blow-off valve,
- the third valve set connected between the compression chamber and the accumulator comprises a second check valve and a second solenoid valve, and
- in the calculation of the damper velocity, the discharge flow rate is calculated from a sum of a flow rate of fluid discharged by the pump, flow rates with respect to the first solenoid valve and the first blow-off valve, and a flow rate with respect to the first check valve, the flow rates with respect to the first solenoid valve and the first blow-off valve being caused by the difference between the sensed pressure of the rebound chamber and the sensed pressure of the compression chamber, and the flow rate with respect to the first check valve being caused by the sensed pressure of the rebound chamber and the sensed pressure of the accumulator.

* * * * *